(12) United States Patent
Olberding et al.

(10) Patent No.: US 7,478,816 B2
(45) Date of Patent: Jan. 20, 2009

(54) SEAL STIFFENER

(75) Inventors: Jason G. Olberding, Marshalltown, IA (US); Douglas J. Boyd, Marshalltown, IA (US)

(73) Assignee: Fisher Controls International, LLC, Saint Louis, MO (US)

( * ) Notice: Subject to any disclaimer, the term of this patent is extended or adjusted under 35 U.S.C. 154(b) by 9 days.

(21) Appl. No.: 10/842,679

(22) Filed: May 10, 2004

(65) Prior Publication Data

US 2005/0248095 A1 Nov. 10, 2005

(51) Int. Cl.
*F16J 3/00* (2006.01)
(52) U.S. Cl. .................. 277/628; 277/644; 277/654; 251/173; 251/306
(58) Field of Classification Search ............... 277/628, 277/644, 647, 654; 251/173, 174, 306; 137/74
See application file for complete search history.

(56) References Cited

U.S. PATENT DOCUMENTS

| | | | | |
|---|---|---|---|---|
| 4,005,848 A | * | 2/1977 | Eggleston | 251/173 |
| 4,202,365 A | * | 5/1980 | Aoki et al. | 137/72 |
| 4,244,387 A | * | 1/1981 | Snape | 137/72 |
| 4,398,695 A | | 8/1983 | Torche | 251/306 |
| 4,487,216 A | * | 12/1984 | Barker et al. | 137/74 |
| 4,491,298 A | * | 1/1985 | Beauchamp et al. | 251/306 |
| 4,502,663 A | | 3/1985 | Huber et al. | |
| 4,505,290 A | | 3/1985 | Scobie et al. | |
| 4,582,080 A | * | 4/1986 | Stock | 137/74 |
| 4,898,363 A | * | 2/1990 | Burton | 251/173 |
| 4,944,489 A | | 7/1990 | Adams et al. | |
| 5,865,422 A | | 2/1999 | Barker et al. | |
| 6,027,126 A | * | 2/2000 | Peterschmitt et al. | 277/644 |

FOREIGN PATENT DOCUMENTS

CN    2135699 Y    6/1993

OTHER PUBLICATIONS

*Flowseal High Performance Butterfly Valves*, Crane.The Valve Experts, Document No. GV-501A, Apr. 2003, 28 pages.
*Type 8510 and 8510B Eccentric Disk Control Valves (EMA)*, Emerson Process Management Product Bulletin, Sep. 2002, 20 pages.
*High Performance Butterfly Valves*, Fisher-Rosemount Product Flier PF51.6:8510B, Mar. 1997, 20 pages.
PCT/US2005/010440, Written Opinion fo the International Searching Authority, mailed Jun. 29, 2005.
PCT/US2005/010440, International Search Report, mailed Jun. 29, 2005.
State Intellectual Property Office of China, first Office action issued on Apr. 11, 2008, in connection with counterpart Chinese application No. 200580015087.9 (12 pages).

* cited by examiner

*Primary Examiner*—William L. Miller
(74) *Attorney, Agent, or Firm*—Hanley, Flight & Zimmerman, LLC

(57) ABSTRACT

Apparatus for increasing stiffness in a seal are disclosed. A disclosed apparatus includes a first flexible member having a curved sealing surface and a second flexible member adjacent to a retainer side of the first flexible member. The second flexible member is configured to increase a stiffness of the first flexible member in one of a plurality of flow directions.

20 Claims, 5 Drawing Sheets

SEAL STIFFENER

TECHNICAL FIELD

The present disclosure pertains to seals and, more particularly, to an apparatus for increasing stiffness in a seal.

BACKGROUND

Typically, it is necessary to control the transmission of fluids in industrial processes, such as oil and gas pipeline distribution systems, chemical processing plants, etc. In some process control systems, process fluid control devices, such as butterfly valves, provide a means to control the transmission of the fluids and, in particular, may provide shut-off capabilities in a forward fluid flow direction and a reverse fluid flow direction. Although many process fluid control devices provide shut-off capabilities in both forward and reverse flow directions, these process fluid control devices may not provide the same degree of shut-off in both flow directions. For example, a butterfly valve may provide shut-off capabilities for up to a 300 psi pressure drop in a forward flow direction but may only provide shut-off capabilities for up to a 100 psi pressure drop in a reverse flow direction.

Process fluid control devices may not provide equal shut-off capabilities in both fluid flow directions due to mechanical tolerances in the construction of the process fluid control device and the design of the process fluid control device. In a forward flow direction, a movable flow control member used to control and/or stop fluid flow through the process fluid control device (e.g., a disk of a butterfly valve or any other mechanical element used to control and/or stop fluid flow) may have tapered edges so that the diameter at one end of the movable flow control member is larger than the diameter of the flow control member at an opposite end. The movable flow control member may be coupled to the process fluid control device so that the end of the movable flow control member having the larger diameter is configured to prevent a sealing member from flexing too far the in the forward fluid flow direction. In particular, in response to fluid pressure in the forward flow direction, the increasing diameter of the movable flow control member allows the sealing member to flex and maintain contact with the outer surface (e.g., the tapered edge) of the movable flow control member. In a reverse flow direction, the amount the sealing member flexes in the reverse flow direction may be too large to maintain contact with the tapered edge of the movable flow control member. As a result, a fluid seal between the sealing member and the movable flow control member may be compromised (e.g., broken) and fluid is allowed to pass by the movable flow control member.

SUMMARY

In accordance with one example, a sealing apparatus includes a first flexible member comprising a curved sealing surface and a second flexible member adjacent to a retainer side of the first flexible member. The second flexible member is configured to increase a stiffness of the first flexible member in one of a plurality of flow directions.

In accordance with another example, a sealing device includes a clamping portion configured to be rigidly coupled to a body of a process fluid control device. The sealing device also includes a flexible portion that extends from the clamping portion and has a curved sealing surface configured to seal against a movable flow control member associated with the process fluid control device. The flexible portion is configured to have a first stiffness in a first flow direction and a second stiffness in a second flow direction.

DETAILED DESCRIPTION

Figure 1:
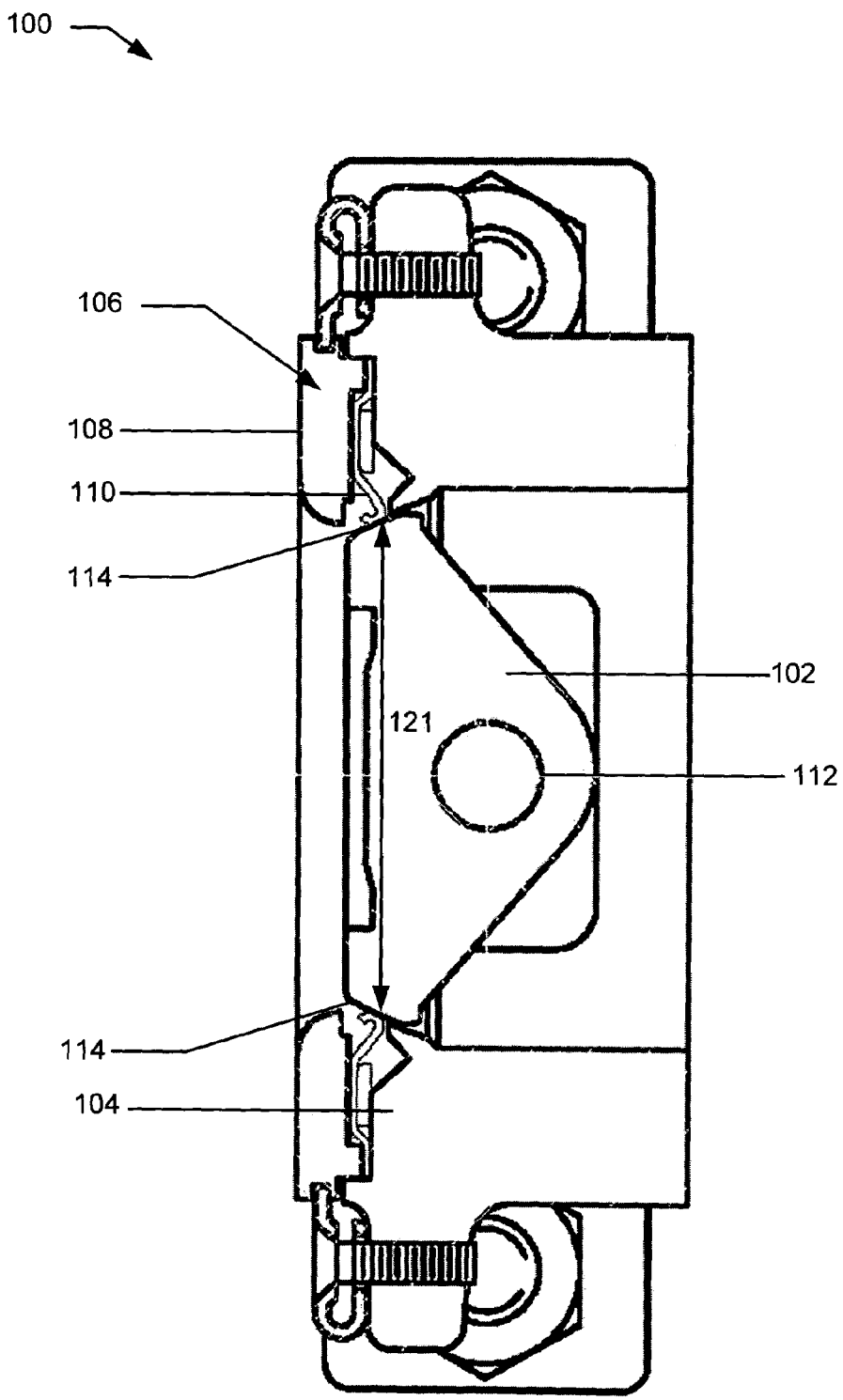
FIG. 1 is a cross-sectional view of a portion of a known butterfly valve.

FIG. 1 is a cross-sectional view of a portion of a known butterfly valve 100. The butterfly valve 100 shown in FIG. 1 may, for example, be used to control the flow and/or pressure of a fluid, such as natural gas, oil, water, etc. in high temperature environments. Thus, the butterfly valve 100 may be made of materials such as, for example, stainless steel, that can withstand such environments.

As shown in FIG. 1, the butterfly valve 100 has a disk 102 (e.g., a movable flow control member) at which a relatively high pressure fluid may be presented. The butterfly valve 100 also includes a valve body 104 and a sealing structure 106 coupled to the valve body 104. The sealing structure 106 includes a seal retainer 108 and a sealing ring 110 and is configured to form a fluid seal between the disk 102 and the sealing ring 110.

The disk 102 may be eccentrically mounted to the valve 100 via a shaft 112 that is offset from the center line of the valve body 104. The disk 102 is securely attached to the shaft 112. In operation, when fluid passes through the valve 100, the disk 102 and the shaft 112 rotate within the valve 100 so that a tapered edge 114 of the disk 102 is spaced from the sealing ring 110 (e.g., in an open position). The disk 102 may also be rotated to a closed position (e.g., the tapered edge 114 of the disk 102 is brought into contact with the sealing ring 110) to form a fluid seal with the sealing structure 106 to prevent process fluid from passing through the butterfly valve 100. The eccentrically mounted disk 102 may be configured to provide an approximately linear flow characteristic and, thus, may be used for on/off and/or throttling control applications.

Figure 2A:
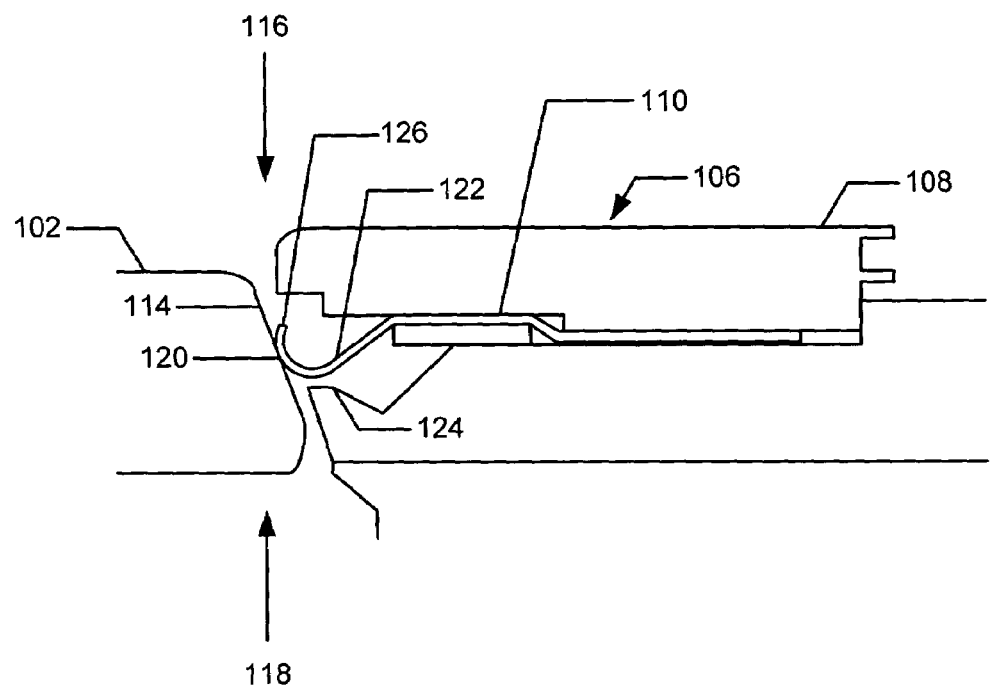
FIG. 2a is an enlarged cross-sectional view of a portion of the known sealing structure used in FIG. 1.

FIG. 2a is an enlarged cross-sectional view of a portion of the sealing structure 106 of FIG. 1. The sealing structure 106 is configured to form a seal with the disk 102 to prevent the flow of the fluid in a forward flow direction 116 and/or a reverse flow direction 118. A fluid seal is formed between the disk 102 and the sealing structure 106 when the disk 102 is rotated to a closed position and contacts a curved sealing surface 120 of the sealing ring 110. The sealing ring 110 may be made of a flexible material (e.g., stainless steel) suitable for use in high temperature applications such as those described above. The sealing ring 110 may have an inner diameter 121 (FIG. 1) approximately equal to the average diameter of the disk 102. As shown in FIG. 2a, a flexible portion 122 of the sealing ring 110 is disposed between a seal support 124 and the seal retainer 108.

In operation, when the disk 102 is closed (i.e., is in contact with the curved sealing surface 120) and fluid pressure is applied to the disk 102 in the forward flow direction 116, the sealing ring 110 is flexed in the forward flow direction 116 until the sealing ring 110 abuts or contacts the tapered edge 114 of the disk 102 and/or the seal support 124. As pressure increases, the fluid seal is not compromised or broken because the flexible portion 122 of the sealing ring 110 is supported by or drives against of the tapered edge 114 of the disk 102 and towards the larger diameter end of the disk 102.

Figure 2B:
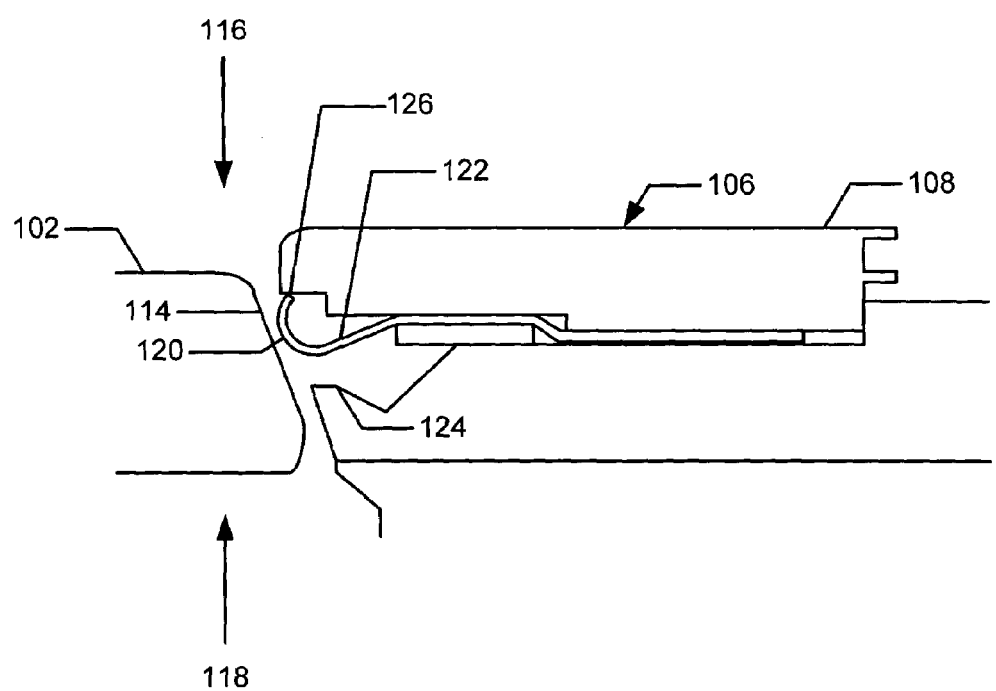
FIG. 2b is an enlarged cross-sectional view of the portion of the known sealing structure of FIG. 2a as fluid pressure is applied to the sealing structure in a reverse flow direction.

FIG. 2b is an enlarged cross-sectional view of the sealing structure 106 of FIG. 1 depicting a reverse flow pressure drop within the body of the butterfly valve 100 (e.g., the condition in which the disk 102 is closed and fluid pressure is applied in the reverse flow direction 118, thereby flexing the flexible portion 122 of the sealing ring 110 in the reverse flow direction 118). As the fluid pressure increases, the fluid seal may ultimately be compromised or broken because the flexible portion 122 of the sealing ring 110 flexes away from the disk 102 as shown in FIG. 2b and, thus, is not supported by the tapered edge 114 of the disk 102. As can be appreciated from FIG. 2, the tapered edge 114 of the disk 102 does not support the flexible portion 122 of the sealing ring 110 in the reverse flow direction 118 because the diameter of the disk 102 decreases in the reverse flow direction 118.

Figure 3:
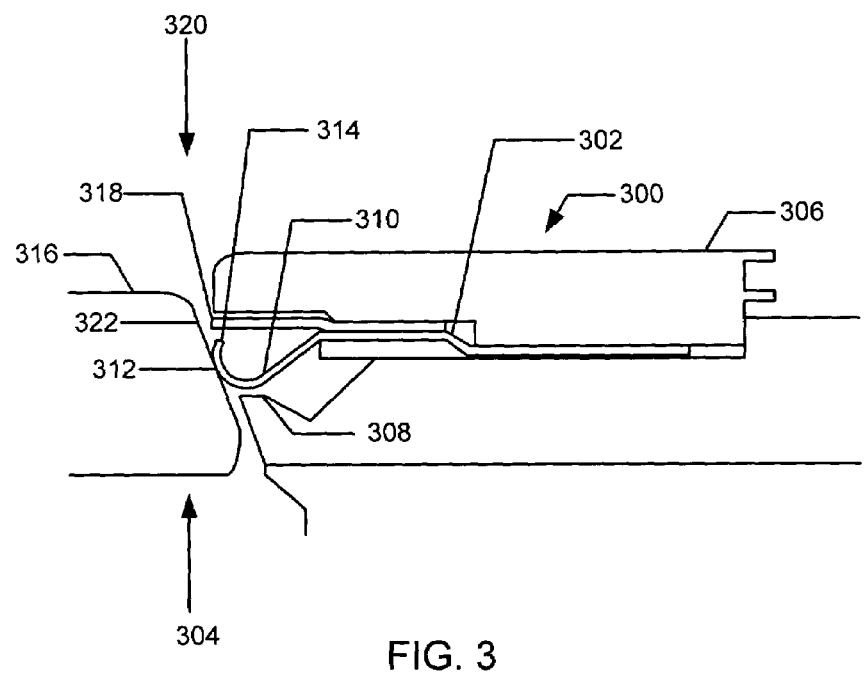
FIG. 3 is a cross-sectional view of a first apparatus that increases the stiffness of a seal in a reverse flow direction.

FIG. 3 illustrates a cross-sectional view of a first sealing structure 300 that increases the stiffness of a sealing ring 302 in a reverse flow direction 304. As depicted in FIG. 3, the sealing structure 300 includes a seal retainer 306 and a seal support 308 that are similar to the seal retainer 108 and the seal support 124 of FIG. 2a. Additionally, the sealing ring 302 includes a flexible portion 310, a curved sealing surface 312, a tip portion 314, and a disk 316 configured to form a fluid seal against the curved sealing surface 312.

In contrast to the sealing structure 106 of FIG. 1, the sealing structure 300 includes an example flexible member 318 adjacent to the retainer side of the sealing ring 302. The flexible member 318 is configured to increase the stiffness of the sealing ring 302 (i.e., functions as a seal stiffener) in the reverse flow direction 304 and is further configured to not interfere with the functionality of the sealing structure 300 in a forward flow direction 320 (e.g., the stiffness of the sealing ring 302 is not affected by the flexible member 318 in the forward flow direction 320). As shown in FIG. 3, the example flexible member 318 or seal stiffener 318 is disposed between the seal retainer 306 and the sealing ring 302. In some examples, the seal stiffener 318 may not be fastened to the seal retainer 306 and/or the sealing ring 302. For example, the seal stiffener 318 may be captured or clamped between, but not permanently fixed to, the sealing ring 302 and seal retainer 306. As a result, the flexible portion 310 is configured to have one stiffness in the forward flow direction 320 and another or different stiffness in the reverse flow direction 304.

One with ordinary skill in the art will readily appreciate that a variety of different materials may be used to implement the seal stiffener 318. For example, the seal stiffener 318 may be composed of a similar material to the material used to form the sealing ring 302 and/or may be made of a material that has relatively improved wear and/or corrosion resistance than that of the sealing ring 302. Alternatively, the seal stiffener 318 may also be composed of a material that has less wear resistance than that of the sealing ring 302 because the seal stiffener 318 does not maintain sliding contact with the sealing ring 302.

Figure 4:
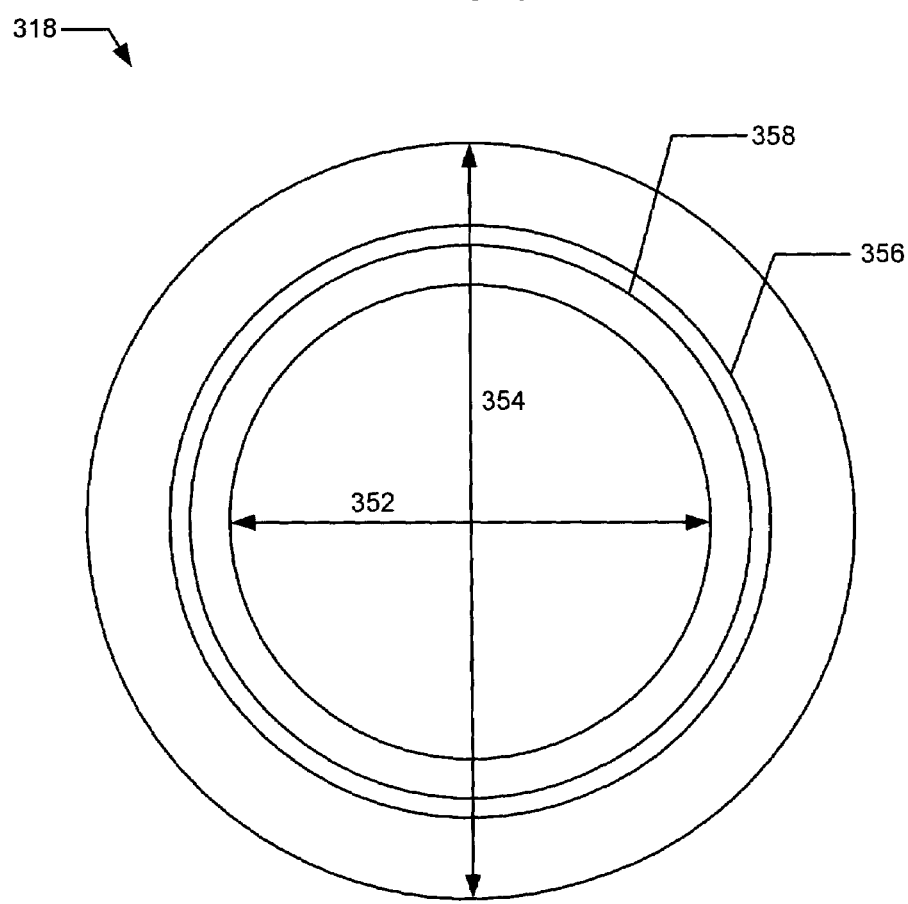
FIG. 4 is a plan view of the first apparatus depicted in FIG. 3.

FIG. 4 illustrates a plan view of the seal stiffener 318. The seal stiffener 318 may have a washer-like shape with an inner diameter 352 equal to the inner diameter of the sealing ring 302. The seal stiffener 318 may have an outer diameter 354 that is large enough so that the seal stiffener 318 is securely captured between a clamping portion (e.g., the seal retainer 306) and the sealing ring 302. The seal stiffener 318 may be substantially planar or may have a contoured profile. The contoured profile may be formed by bends 356 and 358. Additionally, the seal stiffener 318 may be configured to interfere with abrasive media making contact with the sealing ring 302, thereby functioning as a shield to protect the curved sealing surface 312 from abrasive media.

Alternatively, the seal stiffener 318 may have a plurality of flexible cantilevered members, each of which may have one end captured between the sealing ring 302 and the seal retainer 306 and another end extending to at least the tip portion 314 of the sealing ring 302. The plurality of cantilevered members may be uniformly spaced around the circumference of the sealing ring 302 and/or may be spaced around the circumference of the sealing ring 302 in any desired configuration so that the plurality of cantilevered members substantially uniformly increase the stiffness of the entire sealing ring 302 in the reverse flow direction 304.

Returning to FIG. 3, as fluid pressure in the reverse flow direction 304 is applied to the disk 316 in the closed position, the sealing ring 302 is flexed in the reverse flow direction 304 until the tip portion 314 abuts or contacts the seal stiffener 318. In this manner, the seal stiffener 318 acts as a flexible support for the tip portion 314 of the sealing ring 310. As a result, the seal stiffener 318 increases the stiffness of the flexible portion 310 in the reverse flow direction to prevent the sealing ring 302 from flexing too far so that the fluid seal between a tapered edge 322 of the disk 316 and the curved sealing surface 312 is not compromised or broken.

Figure 5:
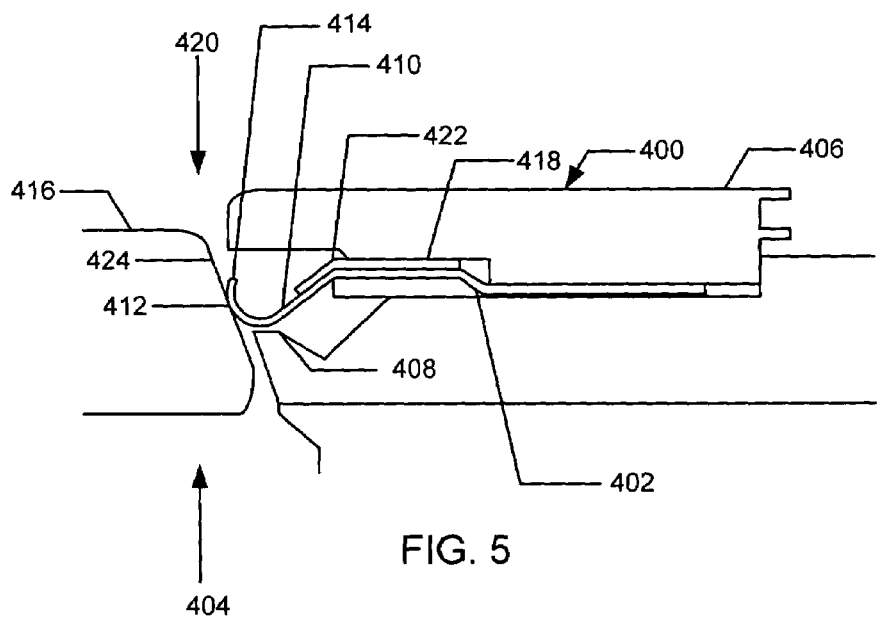
FIG. 5 is a cross-sectional view of a second apparatus that increases the stiffness of a seal in a reverse flow direction.

FIG. 5 illustrates a cross-sectional view of another example sealing structure 400 that increases the stiffness of a sealing ring 402 in a reverse flow direction 404. As depicted in FIG. 5, the sealing structure 400 includes a seal retainer 406 and a seal support 408 that are similar to the seal retainer 108 and the seal support 124 of FIG. 2a. Additionally, the sealing ring 402 includes a flexible portion 410, a curved sealing surface 412, a tip portion 414, and a disk 416 configured to form a fluid seal against the curved sealing surface 412.

In contrast to the sealing structure 106 of FIG. 1, the sealing structure 400 includes a flexible member 418 adjacent to the retainer side of the sealing ring 402. Similar to the example flexible member 318 of FIG. 3, the example flexible member 418 is configured to increase the stiffness of the sealing ring 402 (i.e., functions as a seal stiffener) in the reverse flow direction 404 and to not interfere with the functionality of the sealing structure 400 in a forward flow direction 420. As depicted in FIG. 5, the example flexible member 418 or seal stiffener 418 may be disposed between the seal retainer 406 and the sealing ring 402. Preferably, the seal stiffener 418 is not fastened or permanently joined to the seal retainer 406 and/or at least the flexible portion 410 the sealing ring 402 so that it does not interfere with the functionality of the sealing structure 400 in the forward flow direction 420. As a result, the flexible portion 410 is configured to have one stiffness in the forward flow direction 420 and another or different stiffness in the reverse flow direction 404.

The example seal stiffener 418 may be composed of a material similar to that used to form the sealing ring 402 and/or may be made of a material that has relatively improved wear and/or corrosion resistance than that of the material used to form the sealing ring 402. Alternatively, the seal stiffener 418 may be composed of a material that has similar or less wear resistance than that of the sealing ring 402 because the seal stiffener 418 does not maintain sliding contact with the sealing ring 402.

Figure 6:
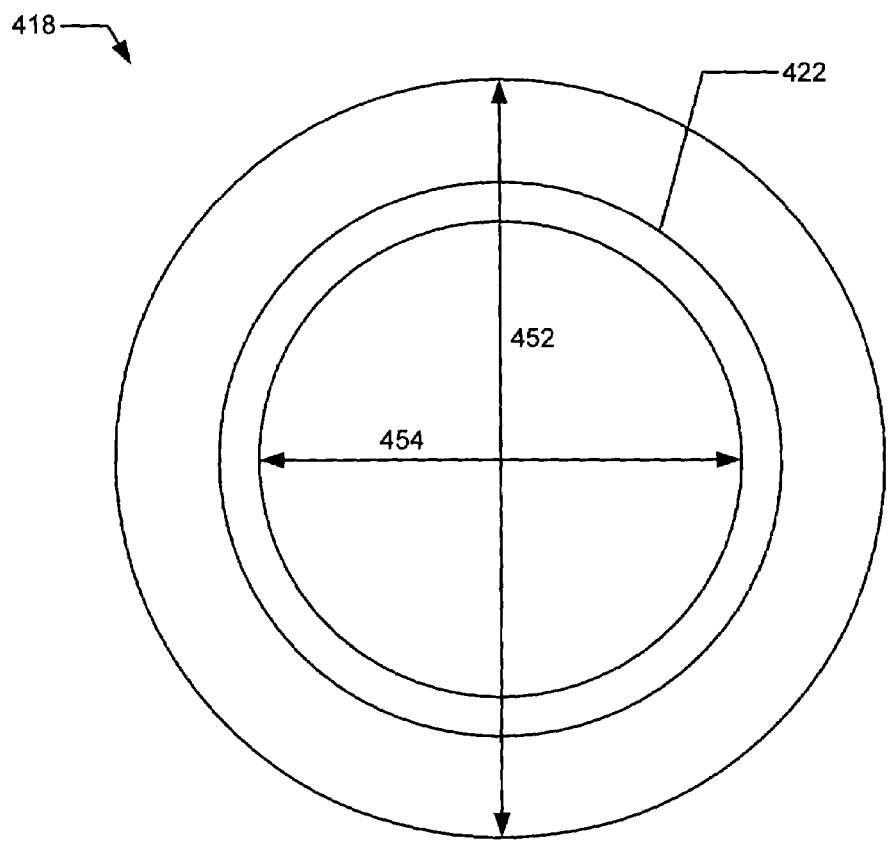
FIG. 6 is a plan view the second apparatus depicted in FIG. 5.

The seal stiffener 418 may have an overall shape similar to that of a washer but is not planar. As depicted in FIG. 6, the seal stiffener 418 may have an outer diameter 452 that is similar to the outer diameter 354 of the seal stiffener 318 of FIG. 4, but which does not extend to the tip portion 414 of the sealing ring 402. Instead, the example seal stiffener 418 is contoured to have a bend 422 to follow the contour of the sealing ring 402 and, as a result, the seal stiffener 418 has a non-planar geometry. Thus, the example seal stiffener 418 is configured to increase the thickness of a portion of the sealing ring 402 and/or the flexible portion 410. For example, as shown in FIG. 5, the seal stiffener 418 does not extend along the full length of the flexible portion 410 but, rather, extends along a portion of the flexible portion 410.

Similar to the seal stiffener 318 of FIG. 3, the seal stiffener 418 may also be composed of a plurality of flexible cantilevered members, each of which may have one end captured between the sealing ring 402 and the seal retainer 406 and another end contoured to have the bend 422 similar to that used with the example sealing ring 402. The plurality of cantilevered members may be uniformly spaced around the circumference of the sealing ring 402 and/or may be spaced around the circumference of the sealing ring 402 in any desired configuration so that the plurality of cantilevered members uniformly increase the stiffness of the entire sealing ring 402 in the reverse flow direction 404.

Similar to the sealing structure 300 of FIG. 3, as fluid pressure in the reverse flow direction 404 is applied to the disk 416 in the closed position, the flexible portion 410 of the sealing ring 402 is flexed in the reverse flow direction 404. The seal stiffener 418 increases the stiffness of the flexible portion 410 by supporting the flexible portion 410 (e.g., at or near the bend 422). By supporting the flexible portion 410, the fluid seal between a tapered edge 424 of the disk 416 and the curved sealing surface 412 is not broken due to the increased fluid pressure in the reverse flow direction 404. More specifically, the seal stiffener 418 significantly increases the stiffness of the flexible portion 410 in the reverse flow direction 404, thereby substantially decreasing the degree to which the curved sealing surface 412 can travel along the tapered edge 424 of the disk 416 toward the smaller diameter end of the disk 416.

Figure 7:
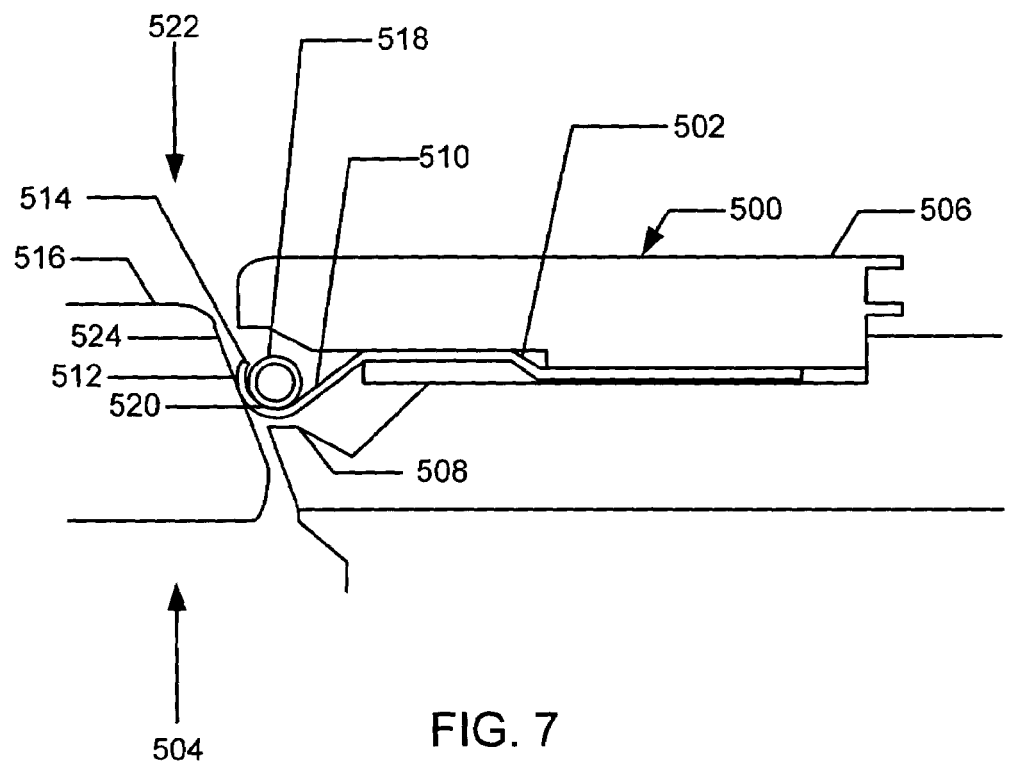
FIG. 7 is a cross-sectional view of a third apparatus that increases the stiffness of a seal in a reverse flow direction.

FIG. 7 illustrates a cross-sectional view of a yet another sealing structure 500 that increases the stiffness of a sealing ring 502 in a reverse flow direction 504. As depicted in FIG. 7, the sealing structure 500 includes a seal retainer 506 and a seal support 508 that are similar to the seal retainer 108 and the seal support 124 of FIG. 2a. Additionally, the sealing ring 502 includes a flexible portion 510, a curved sealing surface 512, a tip portion 514, and a disk 516 configured to form a fluid seal against the curved sealing surface 512.

Unlike the example sealing structure 300 of FIG. 3 and the example sealing structure 400 of FIG. 5, the example sealing structure 500 of FIG. 7 includes a compressible cylindrical member 518 configured to rest in an annular cavity or recess, a trough, a well, or a channel between the seal retainer 506 and the curved sealing surface 512. For ease of discussion, the annular cavity, the trough, the well, or the channel will be herein referred to as the annular recess 520. For example, the compressible cylindrical member 518 may be a helical spring. The compressible cylindrical member 518 may be fastened to the annular recess 520 of the curved sealing surface 512. The placement of the compressible cylindrical member 518 prevents the compressible cylindrical member 518 from affecting the stiffness of the sealing ring 502 in a forward flow direction 522.

The compressible cylindrical member 518 may be composed of a similar material as the sealing ring 502 and/or may be made of a material that has relatively improved wear and/or corrosion resistance than that of the material used to form the sealing ring 502. Alternatively, the seal stiffener 518 may be composed of a material that has similar or less wear resistance than that of the sealing ring 502 because the seal stiffener 518 does not maintain sliding contact with the sealing ring 502. The compressible cylindrical member 518 may also have a length so that the compressible cylindrical member 518 rests in the annular recess 520 formed by the curved sealing surface 512.

Alternatively, the compressible cylindrical member 518 may be composed of a plurality of helical springs disposed along the annular recess 520 of the sealing ring 502. Such a plurality of helical springs may be placed in the annular recess 520 of the curved sealing surface 512 and disposed uniformly along the annular recess 520. Alternatively, such a plurality of helical springs may be placed in any configuration that substantially uniformly increase the stiffness of the entire sealing ring 502 in the reverse flow direction 504.

As fluid pressure in the reverse flow direction 504 is applied to the disk 502 in the closed position, a seal is formed between the disk 502 and the curved sealing surface 512. As the reverse flow fluid pressure increases, the flexible portion 510 increasingly flexes in the reverse flow direction 504 until the compressible cylindrical member 518 is compressed against the seal retainer 506, thereby preventing the tip portion 514 of the sealing ring 502 from abutting or contacting the seal retainer 506. In this manner, the compressible cylindrical member 518 prevents the fluid seal between a tapered edge 524 of the disk 516 and the curved sealing surface 512 from being compromised or broken.

Although certain methods, apparatus, and articles of manufacture have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A sealing apparatus comprising:
   a first flexible member comprising a curved sealing portion having a concave surface and being configured to provide a first stiffness in a first flow direction; and
   a second flexible member disposed between a retainer and the concave surface of the first flexible member and configured to provide a second stiffness of the first flexible member in a second flow direction, wherein the second flexible member does not interfere with the first flexible member in the first flow direction.

2. A sealing apparatus as defined in claim 1, wherein the second flexible member comprises an inner diameter approximately equal to the inner diameter of the first flexible member.

3. A sealing apparatus as defined in claim 2, wherein the second flexible member is configured to protect the curved portion of the first flexible member from abrasive media.

4. A sealing apparatus as defined in claim 1, wherein the second flexible member is configured to contact the curved sealing portion of the first flexible member in response to a pressure in the second flow direction.

5. A sealing apparatus as defined in claim 1, wherein the second flexible member comprises at least one compressible cylindrical member.

6. A sealing apparatus as defined in claim 5, wherein the at least one compressible cylindrical member is disposed adjacent to the retainer side of the first flexible member.

7. A sealing apparatus as defined in claim 5, wherein the at least one compressible cylindrical member is configured to engage a retainer cavity wall when displaced in the one of the plurality of flow directions.

8. A sealing device, comprising:
a clamping portion configured to be rigidly coupled to a body of a fluid control device;
a curved sealing portion configured to seal against a movable flow control member associated with the fluid control device, the curved sealing portion further comprising a flexible portion coupling the curved sealing portion to the clamping portion; and
a stiffening member adjacent to the flexible portion on a concave side of the curved sealing portion, wherein the flexible portion provides a first stiffness to the curved sealing portion in a first flow direction and the stiffening member provides an increased second stiffness to the curved sealing portion in a second flow direction, and wherein the stiffening member does not interfere with the first flexible member in the first flow direction.

9. A sealing device as defined in claim 8, wherein the stiffening portion includes a compressible cylindrical member disposed adjacent to the concave side of the curved sealing portion.

10. A sealing device as defined in claim 8, wherein the curved sealing portion provides an annular sealing surface configured to engage with an outer surface of the movable flow control member.

11. A sealing device as defined in claim 8, wherein at least one of the clamping portion and the flexible portion is made of metal.

12. A sealing device as defined in claim 8, wherein the curved sealing portion is configured to seal against the movable flow control member.

13. A sealing device as defined in claim 8, wherein the movable flow control member is a butterfly valve disk.

14. A sealing device comprising:
a clamping portion configured to be rigidly coupled to a body of a fluid control device;
a curved sealing portion configured to seal against a movable flow control member associated with the fluid control device, the curved sealing portion further comprising a flexible portion coupling the curved sealing portion to the clamping portion; and
a stiffening member adjacent to the flexible portion on a retainer side,
wherein the flexible portion provides a first stiffness to the curved sealing portion in a first flow direction and the stiffening member provides an increased second stiffness to the curved sealing portion in a second flow direction,
wherein the stiffening member does not interfere with the flexible portion in the first flow direction, and
wherein the stiffening member is coupled to the curved sealing portion to contact a tip portion of the flexible portion in response to a reverse flow pressure drop in the second flow direction within the body of the fluid control device.

15. A fluid valve, comprising:
a disk configured to control flow of a fluid; and
a sealing structure comprising:
a first flexible member comprising a curved sealing portion having a concave surface and being configured to engage the disk; and
a second flexible member disposed between a retainer and the concave surface of the first flexible member and being configured to increase a stiffness of the first flexible member in a first flow direction, wherein the second flexible member does not interfere with the first flexible member in a second flow direction.

16. A fluid valve as defined in claim 15, wherein the second flow direction is a forward flow direction.

17. A fluid valve as defined in claim 15, wherein the second flexible member is configured to contact the curved sealing portion of the first flexible member in response to a pressure in the first flow direction.

18. A fluid valve assembly as defined in claim 15, wherein the second flexible member comprises a compressible cylindrical member.

19. A fluid valve comprising:
a disk configured to control flow of a fluid; and
a sealing structure comprising:
a first flexible member comprising a curved sealing surface configured to engage the disk; and
a second flexible member adjacent to a retainer disposed in a first flow direction of the fluid valve and being configured to increase a stiffness of the first flexible member in a second flow direction,
wherein the second flexible member does not interfere with the first flexible member in the first flow direction and
wherein the second flexible member is configured to engage a tip portion of the first flexible member in response to a pressure associated with the second flow direction.

20. A fluid valve assembly as defined in claim 18, wherein the compressible cylindrical member is configured to engage the retainer in response to a pressure in the second flow direction.

* * * * *